Feb. 16, 1965　　　F. HANSELMANN　　　3,169,676
WINDSHIELD CLEANING DEVICE
Filed Jan. 22, 1963　　　2 Sheets-Sheet 1

INVENTOR.
FRANK HANSELMANN
BY
ATTORNEY.

United States Patent Office 3,169,676
Patented Feb. 16, 1965

3,169,676
WINDSHIELD CLEANING DEVICE
Frank Hanselmann, Seestrasse, Stafa,
Zurich, Switzerland
Filed Jan. 22, 1963, Ser. No. 253,156
Claims priority, application Germany, Jan. 31, 1962,
H 44,760
8 Claims. (Cl. 222—373)

This invention relates to a windshield cleaning device and more particularly concerns a compressed air operated mechanism for ejecting a predetermined quantity of liquid for cleaning the windshield of a motor vehicle or the like.

The device of the instant invention is adapted to spray a liquid cleaner such as water against a vehicle windshield for cleaning the same through the usual action of the windshield wipers, without interruption of the normal operation of the vehicle; thereby permitting said cleaning operation to be conducted without impairing the normal operation and safety in driving such vehicle which may have been previously affected by the deposition of foreign material on the windshield.

Known windshield cleaning systems have a number of disadvantages including inadequacy, bulkiness, complicated constructions, high cost and frequent maintenance requirements. In one such known device a hand or foot operated lever controls the pressure for ejecting the water spray and the quantity of liquid dispensed is dependent on the time interval over which the lever is operated.

To shorten such time interval it has been proposed to provide automatic actuating means such as solenoids or the like. Such installations are costly and the quantity of liquid ejected is still determined by the duration of the period of applied pressure, which may be controlled as by delay relays. Furthermore, the quantity of liquid ejected depends on the condition of the nozzle opening, which opening may be reduced by the deposition of foreign matter therein.

Accordingly, with such known spray actuating systems, the quantity of liquid ejected may be insufficient, requiring repeated operation of the device to achieve the desired cleansing action. Also, such systems being of complicated construction, become subject to excessive functional disorders and require frequent repair.

Thus, in one form of known device, a resilient bellows is provided for holding a quantity of liquid which is delivered when compressed air is admitted to a chamber holding the bellows, followed by expansion of the bellows after its contraction on the delivery stroke, to receive an additional quantity of liquid. This construction must utilize a set of check valves plus an intricate pushbutton control valve having a pair of springs which are effective in response to high and low pressure values of the compressed air line. Aside from the complicated and expensive construction of this device, the bellows and spring actuated valves will necessarily involve special maintenance.

In another known device, having a pushbutton operated control valve, the liquid supply container includes a metering chamber disposed internally thereof and requiring a riser pipe to deliver the ejected liquid. This arrangement prevents full utilization of either the metering chamber or the supply container. Also, the control valve is of a complicated construction and includes spring means which may give rise to maintenance problems.

A principal object of this invention is to provide an improved liquid dispensing device for delivering precisely measured quantities of cleansing liquid, such device being of simple construction and including a simple actuating valve.

Another object of this invention is to provide an improved liquid dispensing mechanism which is compact, includes a pushbutton valve for controlling a pneumatic section thereof, which valve is of simple and efficient design.

Yet another object of this invention is to provide a device of the character described wherein means is provided for delivering a measured quantity of cleansing liquid by means of a measured volume of compressed gas.

Other objects of this invention will in part be obvious and in part hereinafter pointed out.

The device of the instant invention comprises essentially a liquid supply chamber, a metering chamber externally related to the supply chamber and in valved communication therewith, a chamber for holding a measured quantity of compressed gas, a gas conduit between the gas chamber and the metering chamber, a delivery conduit extending from the metering chamber, and a pushbutton valve for controlling the entry of compressed air into the air chamber and which is automatically operative to pass the measured volume of compressed air into the metering chamber and to seal the valved connection between the supply chamber and the metering chamber, whereby a measured quantity of liquid in the metering chamber is ejected therefrom through the delivery conduit.

Figure 1:
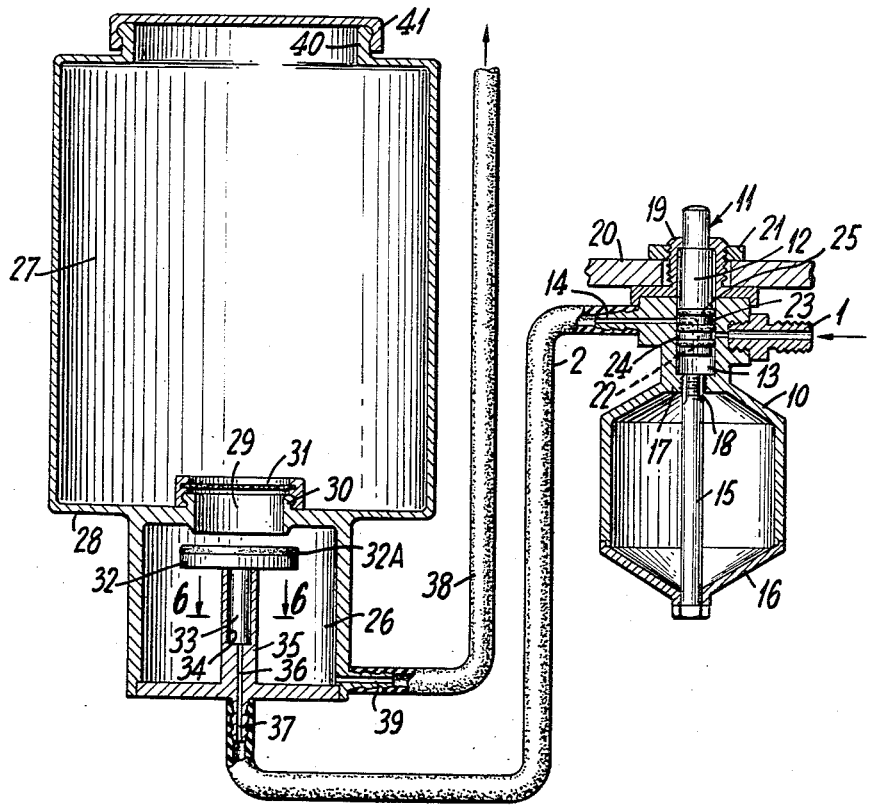
FIG. 1 is a vertical sectional view of a device embodying the invention.

Thus, as shown in FIG. 1, 10 designates a receptacle for receiving and holding a measured volume of compressed air by way of an air inlet nipple 1 connected to a suitable source of compressed air, not shown. The measured volume of compressed air or other gas is adapted to be transmitted from receptacle 10 to a combination cleansing liquid container and associated metering chamber generally indicated at B, by way of a conduit 2.

The inflow of compressed air into receptacle 10 and its outflow into conduit 2 is controlled by a pushbutton type valve 11 which includes a piston portion 12 slidably mounted in a cylinder portion 13 at the upper end of receptacle 10. Inlet nipple 1 is set in the side wall of cylinder portion 13 and conduit 2 is connected to a nipple 14 set in the side wall of cylinder 13 at a level above that of nipple 1.

A bolt 15 holds a bottom wall portion 16 of receptacle 10 in place, the threaded end of said bolt being screwed into the bottom wall 17 of cylinder portion 13 and being longitudinally grooved as at 18 to establish communication between cylinder portion 13 and the interior of receptacle 10. Cap means 19 encloses the upper portion of piston 12 and is secured to the enlarged upper portion of cylinder 13. Cap means 19 serves to limit the upward movement of piston portion 12 of valve 13 and also provides means for mounting receptacle 10 on a bracket 20 by a nut 21 engaging an externally threaded portion of said cap means and in clamping relation to bracket 20.

Piston 12 is formed with an inverted L shaped passage 22 which extends axially to the lower end thereof and radially to the side wall thereof. The piston 12 is formed at its lower end with circumferential grooves 23, 24 and bounded by O rings 25. The radial portion of passage 22 communicates with the upper groove 23. In the raised position of valve 11, as shown in FIG. 1, communication is established between conduit 2 and the interior of receptacle 10 by way of nipple 14, groove 23, passage 22, cylinder 13 and grooves 18; while the connection between nipple 1 and receptacle 10 is closed.

Thus, upon manually depressing valve 11, nipple 1 will be connected to the interior of receptacle 10 by way of groove 23 and passage 22, while communication between said receptacle and conduit 2 is cut off. With valve 11 in its depressed position, receptacle 10 will be filled with compressed air by way of nipple 1. When the valve 11 is released, it will be automatically elevated by the pressure of the air against the bottom of piston 12 in cylinder 13. The measured volume of compressed air can now pass into conduit 2 for delivery to a metering chamber 26 forming a portion of the combination liquid container and metering chamber B.

The combination B comprises a cleansing liquid supply chamber 27 with metering chamber 26 depending therefrom. The common wall 28 of the chambers is formed with an opening 29 defined by an annulus 30 covered at its upper end projecting into chamber 27 by a filter screen 31 and providing at its lower end projecting into chamber 26 a valve seat for a disc valve member 32. Valve member 32 is fixed to a piston 33 slidably mounted in a cylinder 34 formed in an upstanding stem 35 extending from the bottom wall of metering chamber 26. Stem 35 is formed with a passage 36 communicating at its upper end with cylinder 34 and at its lower end with a nipple 37 depending from the bottom wall of the metering chamber 26 for connection with conduit 2.

Figure 5:
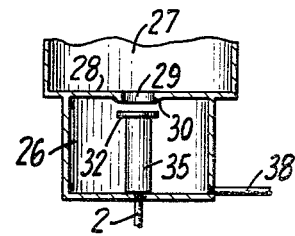
FIG. 5 is a view similar to that of FIG. 4, showing said valve in its open position.
Figure 6:
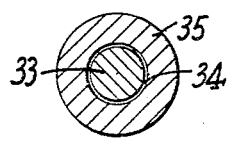
FIG. 6 is a transverse sectional view taken on the line 6—6 of FIG. 1.

It will be apparent that with valve 11 in its raised position and valve disc 32 in its depressed position, as shown in FIGS. 1, 5, the cleansing liquid in supply chamber 27, such as water or the like, passes through opening 29 to fill metering chamber 26, being filtered by screen 31. Valve member 11 is now manually depressed to the position indicated in FIG. 2, whereby compressed air passes into receptacle 10 to fill the same.

Figures 2, 3:
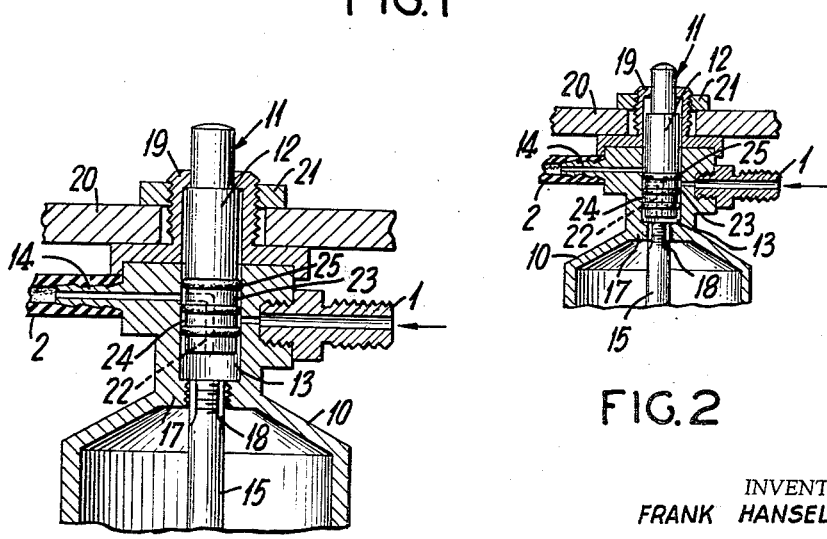
FIG. 2 is a partial sectional view showing the control valve for the pneumatic section of the device, in one position thereof.
FIG. 3 is a view similar to that of FIG. 2, showing the control valve in another position thereof.

When valve 11 is released, it will be automatically elevated to the position indicated in FIGS. 1, 3, whereby the compressed air will pass from receptacle 10 to conduit 2 and thence to passage 35 and cylinder 34 to raise valve disc 32 which carries a gasket 32A to close opening 29. There is sufficient clearance between piston 33 and cylinder 34 to allow the compressed air to pass into chamber 26 and to force the quantity of cleansing liquid in said chamber outwardly thereof by way of a delivery conduit 38 connected to a nipple 39 extending from a lower portion of chamber 26.

Thus, a measured quantity of cleansing liquid is positively ejected by way of conduit 38 to nozzles, not shown, which are connected to the terminal end thereof.

When the cleansing liquid in supply chamber 27 is of certain surface tension, the liquid entering the space between the piston 33 and cylinder 34 provides a gas pressure which allows the valve disc 32 to rise to its closed position before the compressed air is admitted to metering chamber 26. In any event, with admission of compressed air into said chamber 26 before valve disc 32 has closed, the resultant pressure within chamber 26 will automatically move valve disc 32 to its closed position.

The tight fitting O rings 25 on piston 13 will tend to retain valve 11 in its normally elevated position and to retain such position after the valve has been depressed and elevated again by the pressure of the compressed air in cylinder 13. When the pressure within metering chamber 26 is reduced after ejection of its contents into conduit 38, valve disc 32 will be depressed to its normal position by the hydrostatic head of the liquid in supply container 27, refilling chamber 26 for the next operation of valve 11.

It will be apparent that the device of the instant invention is effective to deliver a metered quantity of cleansing liquid by way of a predetermined volume of compressed air calculated in terms of such quantity of liquid. Obviously, the size of receptacle 10 may be varied accordingly. With premeasured volumes of compressed air, the bulk of the supply source of the same, such as tanks, bottles or the like, may be minimized, particularly when other sources of compressed gas usually found in motor vehicles, may not be available.

Furthermore, the supply and metering chambers are subject to relative low pressure conditions and thus may be formed of light construction, yet is adapted to cope with initial pressures sufficient to force any foreign matter deposited in the nozzle, not shown, at the terminal end of conduit 38, out of the nozzle, to thus maintain the effective opening of such nozzle.

The supply chamber 27 is provided with a filling opening 40 of fairly large size, which is closed by a lid 41. Lid 41 does not have to be air tight as chamber 27 is not subjected to elevated pressures. The clearance between piston 33 of the metering valve disc and the cylinder 34 is of the order of .004 to .008 inch.

Figure 7:
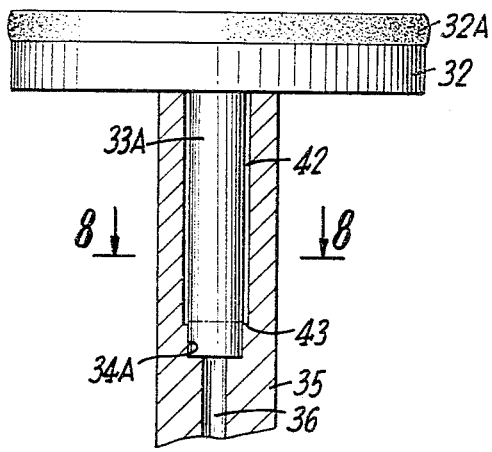
FIG. 7 is a partial vertical sectional view of the metering valve, showing a modified form thereof.
Figure 8:
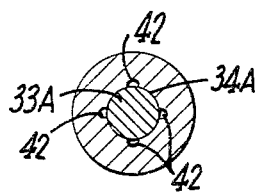
FIG. 8 is a transverse sectional view taken on the line 8—8 of FIG. 7.

An alternative form of the piston-cylinder arrangement for the metering valve disc 32, is shown in FIGS. 7, 8, wherein piston 33 moves in a cylinder 34A. Cylinder 34A is formed with circumferentially spaced, vertically extending grooves 42; which grooves 42 extend downwardly from the top of cylinder 34A to a point short of the bottom thereof, as at 43.

Figure 4:
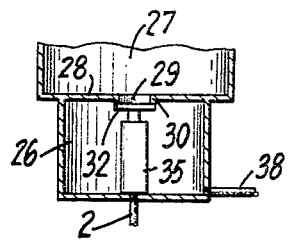
FIG. 4 is a partial elevational view showing the metering valve in its closed position.

Thus, the compressed air admitted to cylinder 34A by way of passage 36 in stem 35 is effective to raise disc 32 to its closed position, as shown in FIG. 4 and thereafter passes by way of grooves 42 into metering chamber 26 to eject the contents thereof into delivery line 38, as previously described.

Figure 9:
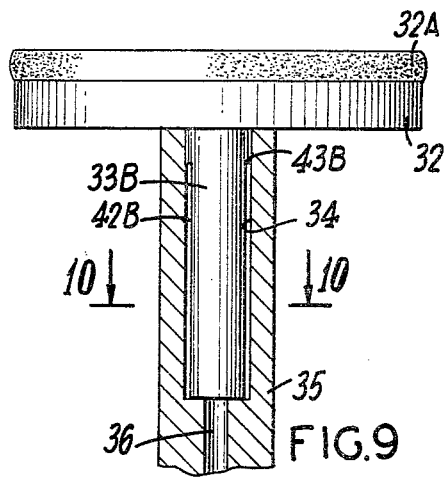
FIG. 9 is a view similar to that of FIG. 7, showing another form of said metering valve.
Figure 10:
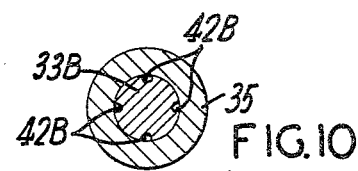
FIG. 10 is a transverse sectional view taken on the line 10—10 of FIG. 9.

Alternatively, as shown in FIGS. 9, 10, the piston 33B moving in cylinder 34, is vertically grooved on its outer surface as at 42B, which grooves extend from the bottom of the piston to a point 43B which is short of the top thereof. Again, piston 33B is raised by the compressed air to close opening 29 in the metering chamber 26 and thereafter, the compressed air passes into said chamber 26 by way of grooves 42B.

Figure 11:
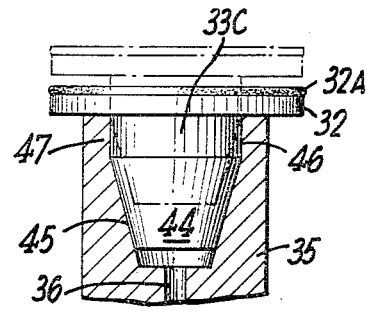
FIG. 11 is a partial vertical sectional view showing still another form of the metering valve.

In a further modification of the metering valve piston, as shown in FIG. 11, the piston 33C is formed with a lower portion 44 of frustoconical shape which seats, when the piston is in its depressed position, in a complementary cylinder portion 45 in stem 35, which cylinder portion communicates with passage 36. The cylindrical portion 46 of piston 33C which moves in the cylinder portion 47 above cylinder portion 45, has a longitudinal extent somewhat less then the total travel of piston from its closed to open positions. Accordingly, when the piston is raised to close the opening of the metering chamber 26, a slight clearance between the tapered surface portion of piston portion 44 and the peripheral edge of cylinder portion 47 allows the compressed air to pass into the metering chamber 26, as previously described.

As the entire system is subjected to elevated pressures only during the momentary period of ejection of the cleansing liquid from the metering chamber, wear of the elements of the system is minimized; loss of compressed air due to leaks is virtually eliminated; and the simple pushbutton control valve reduces maintenance problems.

As various changes might be made in the embodiments of the disclosed invention without departing from the spirit thereof, it is understood that all matter herein shown or described shall be deemed illustrative and not

What is claimed is:

1. A liquid ejecting device comprising a liquid supply chamber, a metering chamber in communicating relation to said supply chamber to be gravity filled with liquid from said supply chamber, a valved connection between said chambers, a liquid delivery conduit extending from said metering chamber, a chamber for containing a predetermined volume of compressed gas and including gas inlet means and gas outlet means, a gas delivery conduit connecting said gas outlet means and said metering chamber, valve means including movable piston means movable to a depressed position thereof for closing said gas outlet means and opening said gas inlet means for passing compressed gas into said gas chamber via said gas inlet means, said piston means being responsive to the pressure of the gas within said gas chamber to move said piston means from said depressed position thereof to its normal elevated position whereby to close said gas inlet means and to open said gas outlet means to connect the interior of said gas chamber with said gas delivery conduit and to pass the gas from said gas chamber to said metering chamber, thereby actuating said valved connection to its closed position and ejecting the liquid contents of said metering chamber into said liquid delivery conduit, said valve means further comprising a cylinder communicating at the lower end thereof with the interior of said gas chamber and on side portions thereof with said gas inlet means and said gas delivery conduit respectively, said piston means being movable in said cylinder and having an inverted L shaped passage therein communicating at the lower end thereof with the lower end of said cylinder and at the upper end thereof selectively with the side portions of said cylinder in accordance with the position of said piston means.

2. A device as in claim 1 wherein said valved connection comprises a common wall portion between the bottom of said supply chamber and the top of said metering chamber, a valve opening in said wall portion, a stem portion upstanding from the bottom wall of said metering chamber and having an axial passage therein communicating at the lower end thereof with said inlet conduit, said stem having a cylinder at the upper end thereof in communication with said passage, a piston slidably mounted in said last mentioned cylinder, a valve disc fixed to the upper end of said last mentioned piston for closing said valve opening, said last mentioned cylinder and associated piston having a clearance therebetween to allow compressed gas to pass therebetween into said metering chamber.

3. A device as in claim 1 and further including gasket means on said piston for frictional contact with the wall of said cylinder to retain said piston in its normally elevated position therein.

4. A liquid dispensing device comprising a liquid supply chamber, a metering chamber beneath said supply chamber and in communicating relation therewith, normally open pressure responsive valve means controlling the communication between said chambers, a liquid delivery line extending from said metering chamber, a compressed gas chamber having inlet means for admitting compressed gas into said gas chamber and gas outlet mean, conduit means connecting said gas outlet means and said metering chamber, manually depressible valve means on said gas chamber for controlling said gas inlet and gas outlet means, said last mentioned valve means being arranged for movement to an elevated position thereof in response to the pressure within said gas chamber, said last mentioned valve means being depressible to a position for closing said gas outlet means while opening said gas inlet means to admit compressed gas into said gas chamber, said last mentioned valve means being raised to the elevated position thereof by pressure of the gas within said gas chamber for closing said gas inlet means and opening said gas outlet means to pass compressed gas from said gas chamber to said metering chamber via said conduit means, pneumatically responsive means operative to close said normally open valve means upon admission of compressed gas into said metering chamber whereby to seal off said supply chamber from said metering chamber and to simultaneously allow the admitted compressed gas within said metering chamber to eject the contents of said metering chamber into said delivery line, said normally open valve means comprising a piston for actuating said normally open valve means, said piston being slidably mounted in cylinder means communicating with said conduit means, said piston and cylinder means including cooperative means for passing compressed gas into said metering chamber after said piston has moved said normally open valve means to its closed position.

5. A device as in claim 4 wherein said cooperative means comprises a slight clearance between opposed surface portions of said piston and cylinder means.

6. A device as in claim 4, wherein said cooperative means comprises longitudinally extending grooves on the inner surface of said cylinder means.

7. A device as in claim 4, wherein said cooperative means comprises longitudinally extending grooves on the outer surface of said piston.

8. A liquid dispensing device comprising a liquid supply chamber, a metering chamber beneath said supply chamber and in communication therewith, normally open pressure responsive valve means between said chambers, a liquid delivery line extending from said metering chamber, a compressed air chamber having outlet means and inlet means for admitting compressed air into said air chamber, conduit means connecting said air chamber and said metering chamber and including means for slidably mounting said normally open valve means, depressible and pneumatically responsive valve means in operative relation to said air chamber for selectively connecting said air chamber with said inlet means and said conduit means, said pneumatically responsive valve means being operative to close said normally open valve means upon admission of compressed air into said conduit means whereby to seal off said metering chamber from said supply chamber and whereby the admitted compressed air is also operative to eject the contents of said metering chamber into said delivery line, said depressible valve means comprising cylinder means communicating at one end thereof with the interior of said air chamber and having a pair of port means respectively communicating with said inlet means and said conduit means, piston means slidably mounted in said cylinder means and having passage means therein communicating at one end thereof with said one end of said cylinder means, said piston means being manually depressible to a position within said cylinder means for effecting communication between the other end of said passage means with said inlet means whereby to fill said air chamber with compressed air, the compressed air within said air chamber being effective to raise the depressed piston means to an elevated position wherein the other end of said passage means communicates with said conduit means to pass compressed air from said air chamber into said conduit means.

References Cited by the Examiner

UNITED STATES PATENTS

| 1,458,852 | 6/23 | Russell | 222—373 X |
|---|---|---|---|
| 2,772,814 | 12/56 | Meyers | 222—394 X |
| 3,072,289 | 1/63 | Stopp | 222—3 |
| 3,113,704 | 12/63 | Fingeroot | 222—373 |

FOREIGN PATENTS 230,886   11/60   Australia.

LOUIS J. DEMBO, *Primary Examiner.*